United States Patent [19]
Hilliard

[11] Patent Number: 5,777,556
[45] Date of Patent: Jul. 7, 1998

[54] DRINKER'S AWARENESS DEVICE

[76] Inventor: Alexander Hilliard, 8903 Ripken La., Tampa, Fla. 33615

[21] Appl. No.: 605,868

[22] Filed: Feb. 23, 1996

[51] Int. Cl.$^6$ ................................................. G08B 23/00
[52] U.S. Cl. ........................................... 340/576; 340/573
[58] Field of Search .................................. 340/576, 575, 340/573; 70/63, 277; 180/272

[56] References Cited

U.S. PATENT DOCUMENTS 4,485,375  11/1984  Hershberger ........................... 340/576
5,148,150  9/1992  White et al. ............................ 340/571

*Primary Examiner*—Jeffery Hofsass
*Assistant Examiner*—Sihong Huang
*Attorney, Agent, or Firm*—Dorothy Morse. Esq.; American Innovations Inc.

[57] ABSTRACT

A warning device for people with the potential of operating a motorized vehicle while under the influence of substances which can impair their judgment and their ability to react to unexpected situations. The warning device is locked onto the steering mechanism of the motorized vehicle and is activated when a movement detector senses the presence of a potential operator. Audio and visual reminders against driving while impaired are provided to the potential operator prior to starting the engine. The warning device can be removed from the steering mechanism through the use of a key, a procedure that could prove difficult for an impaired person. Although it is contemplated for the warning device to be used predominantly on automobiles, applications could also include use on other types of motorized vehicles such as trucks, motorcycles, boats and airplanes.

11 Claims, 4 Drawing Sheets

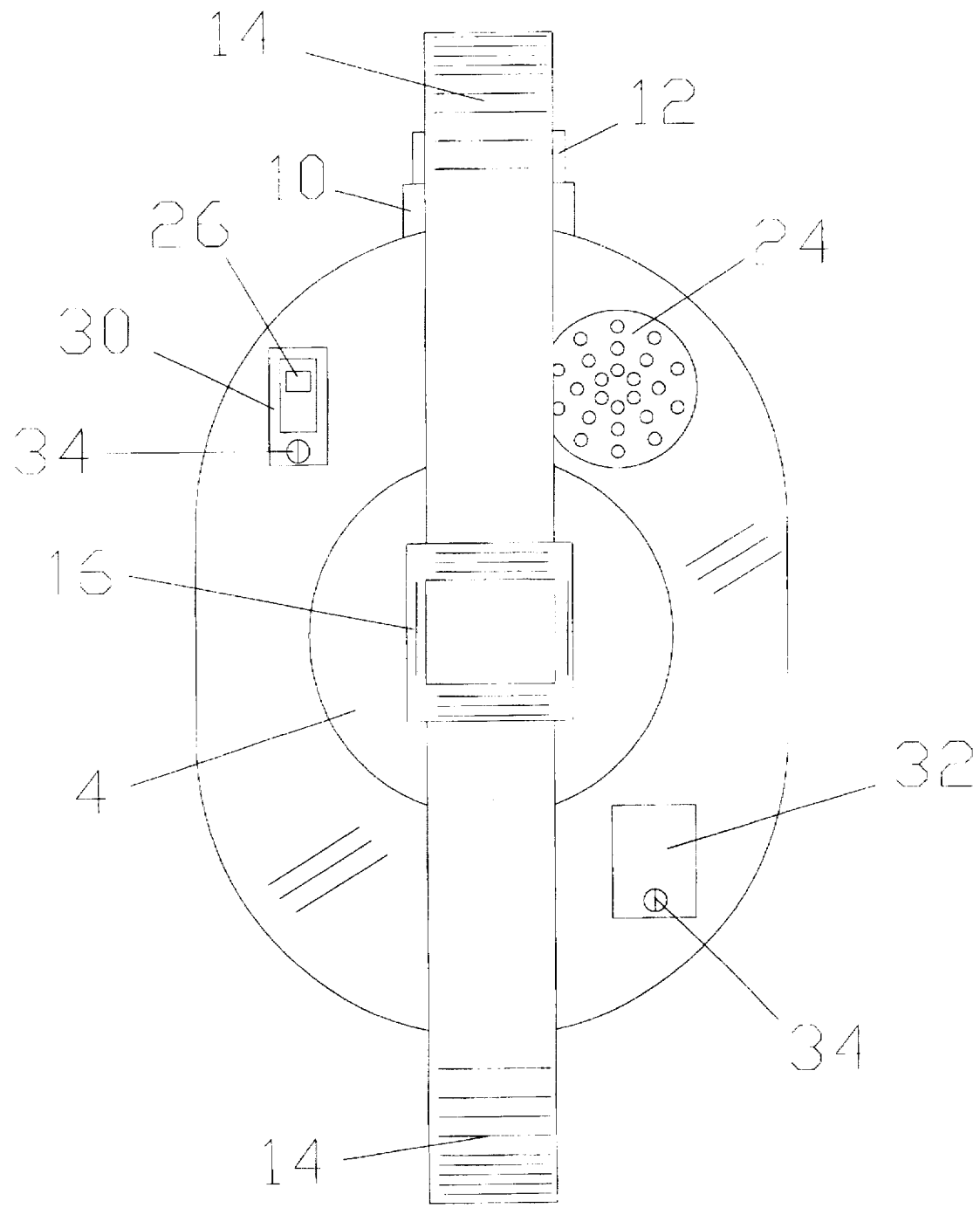

DRINKER'S AWARENESS DEVICE

BACKGROUND

1. Field of Invention

This invention relates to warning devices, specifically to a warning device for people with the potential of driving a motorized vehicle while under the influence of substances which can impair their judgment and their ability to react to unexpected situations, the warning device being locked onto the steering mechanism of a motorized vehicle and providing audio and visual reminders against driving while impaired. Although it is contemplated for the drinker's awareness device to be used predominantly on automobiles, applications could also include use on other types of motorized vehicles such as trucks, motorcycles, boats and airplanes.

2. Description of Prior Art

When a person is known to have a drinking problem, or other substance abuse problem, it is desirable that they do not operate motorized vehicles while in a condition that impairs their judgment and their ability to react to unexpected situations. One problem with substance abuse is that there are many variables involved and impaired people do not always realize the point at which they become impaired.

It is known to have locking devices for automobile ignition systems to prevent drivers who have been convicted of driving under the influence (DUI) from being able to start their automobiles. It is also known to have ignition systems which require an operator to breathe into a sensing device for a breath analysis check prior to starting an automobile. Should the sensing device detect a predetermined amount of alcohol and conclude that the potential operator has been impaired by the use of alcoholic beverages, that operator will be prevented from starting the automobile. While both systems are effective for preventing a potentially impaired operator from starting a motorized vehicle, both systems are expensive. Also, the breath analyzer device fails to provide a safeguard for a driver potentially impaired by substance abuse other than alcohol. It is not known in this field to have a moderately priced device which provides audio and visual warnings to a driver against driving while impaired.

SUMMARY OF INVENTION—OBJECTS AND ADVANTAGES

It is the primary object of this invention to provide a drinker's awareness device that will provide a visual warning to a potential operator of a motorized vehicle against driving while impaired. It is also an object of this invention to provide a drinker's awareness device that will provide an audio warning to a potential operator of a motorized vehicle against driving while impaired. Another object of this invention is to provide a warning device against driving while impaired to operators potentially impaired by alcohol, as well as other types of substance abuse. A further object of this invention is to provide a warning device that is less expensive than currently known ignition system devices which prevent an impaired person from starting a motorized vehicle. It is also an object of this invention to provide a device which is capable of being locked onto the steering mechanism of a motorized vehicle and is easy to remove by an unimpaired person, but which is difficult for an impaired person to remove. A further object of this invention is to provide a warning device for a motorized vehicle that is automatically activated when a person prepares to start the motorized vehicle.

As described herein, properly manufactured and installed on the steering mechanism of a motorized vehicle, the present invention would provide a potential operator of a motorized vehicle with a warning against operating the motorized vehicle while in an impaired condition. The warning device is activated when a movement detector senses the presence of a potential operator. Audio and visual reminders against driving while impaired are provided to the potential operator prior to starting the engine. In the preferred embodiment, the warning device may be removed from the steering mechanism through the use of a key, a procedure that could prove difficult for an impaired person. The audio and visual warnings of the present invention would act as both a reminder and an annoyance to an impaired person. Although the present invention does not prevent an intended operator from starting the motorized vehicle, the flashing lights and audio warning would create an annoyance for an impaired person and could provoke them into abandoning the vehicle or asking someone else to drive it. The goal of preventing them from driving in an impaired condition would then be met.

The description herein provides preferred embodiments of the present invention but should not be construed as limiting the scope of the drinker's awareness device invention. Variations in the number and type of visual and audio warning mechanisms, the size and shape of the outer cover, the attachment of the strap to the outer cover, the material from which the strap is made, the type and number of locking devices used, the placement of the speaker, switches, movement sensors, circuit board and power source within the outer cover, other than those shown and described herein, can be incorporated into the present invention. Thus the scope of the present invention should be determined by the appended claims and their legal equivalents, rather than the examples given.

BRIEF DESCRIPTION OF THE DRAWINGS

FIG. 4 is a back view of the invention.

DETAILED DESCRIPTION OF PREFERRED EMBODIMENTS

Figure 1:
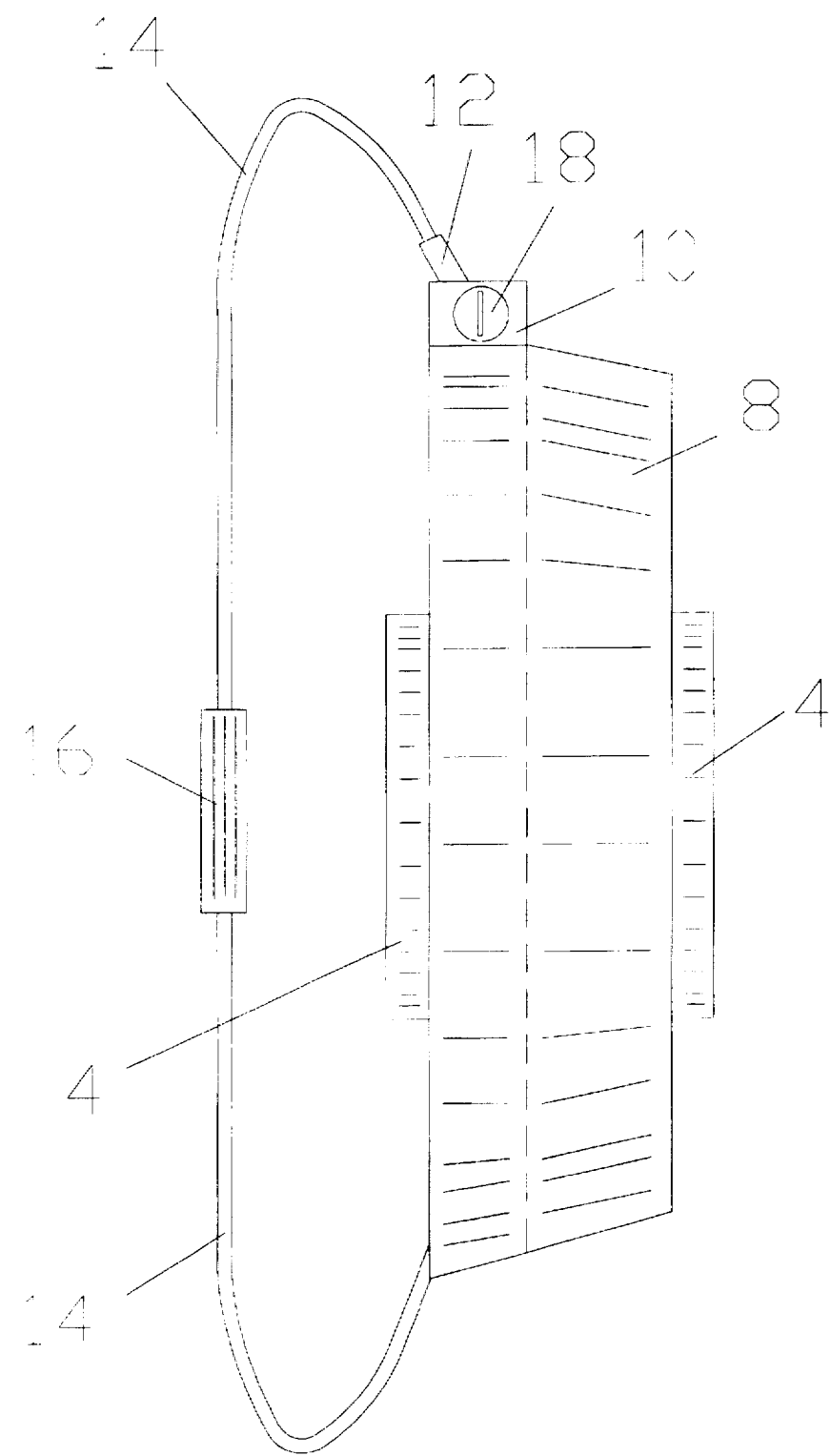
FIG. 1 is a side view of the invention.
Figure 2:
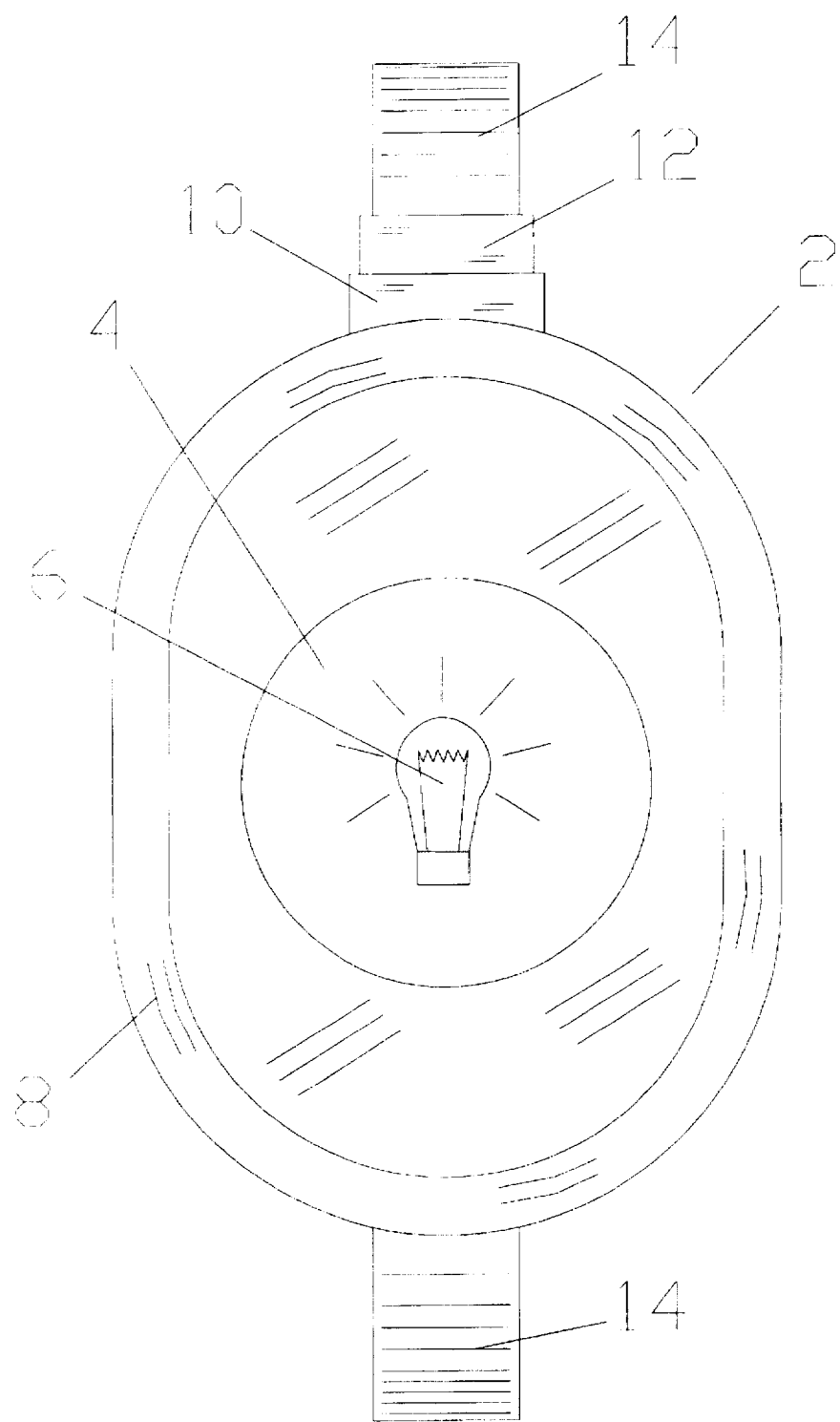
FIG. 2 is a front view of the invention.

FIG. 1 shows the preferred embodiment of a drinker's awareness device invention 2 having a housing 8 attached to a steering wheel strap 14. The materials from which housing 8 and steering wheel strap 14 are made are not critical. However, both housing 8 and steering wheel strap 14 must not be easily broken or dismantled so as to be tamper-proof to an impaired operator. In the preferred embodiment housing 8 is made of a hard plastic material. A strap adjustment 16 is attached to steering wheel strap 14 to allow it to fit onto different sized steering wheels (not shown). One end of steering wheel strap 14 is permanently attached to housing 8. FIG. 1 shows a buckle 12 attached to the other end of steering wheel strap 14, buckle 12 being designed for connection with a buckle locking device 10 located on housing 8. During use of drinker's awareness device invention 2, housing 8 is positioned on the side of a steering wheel (not shown) near to an operator, while steering wheel strap 14 is positioned on the side of the steering wheel (not shown) remote from the operator. A key (not shown), inserted into a keyhole 18 located on buckle locking device 10, locks and unlocks buckle 12 so that steering wheel strap 14 may be engaged and disengaged from its usable position around the steering wheel (not shown). In addition to many of the features shown in FIG. 1. FIG. 2 shows the positioning of a light source 6 on housing 8. Light source 6 may provide a steady or an intermittently activated beam of light and is covered by a lens 4. In the preferred embodiment, lens 4 is made of plastic. FIG. 1 shows lens 4 located on housing 8 in positions both near to and remote from an operator.

Figure 3:
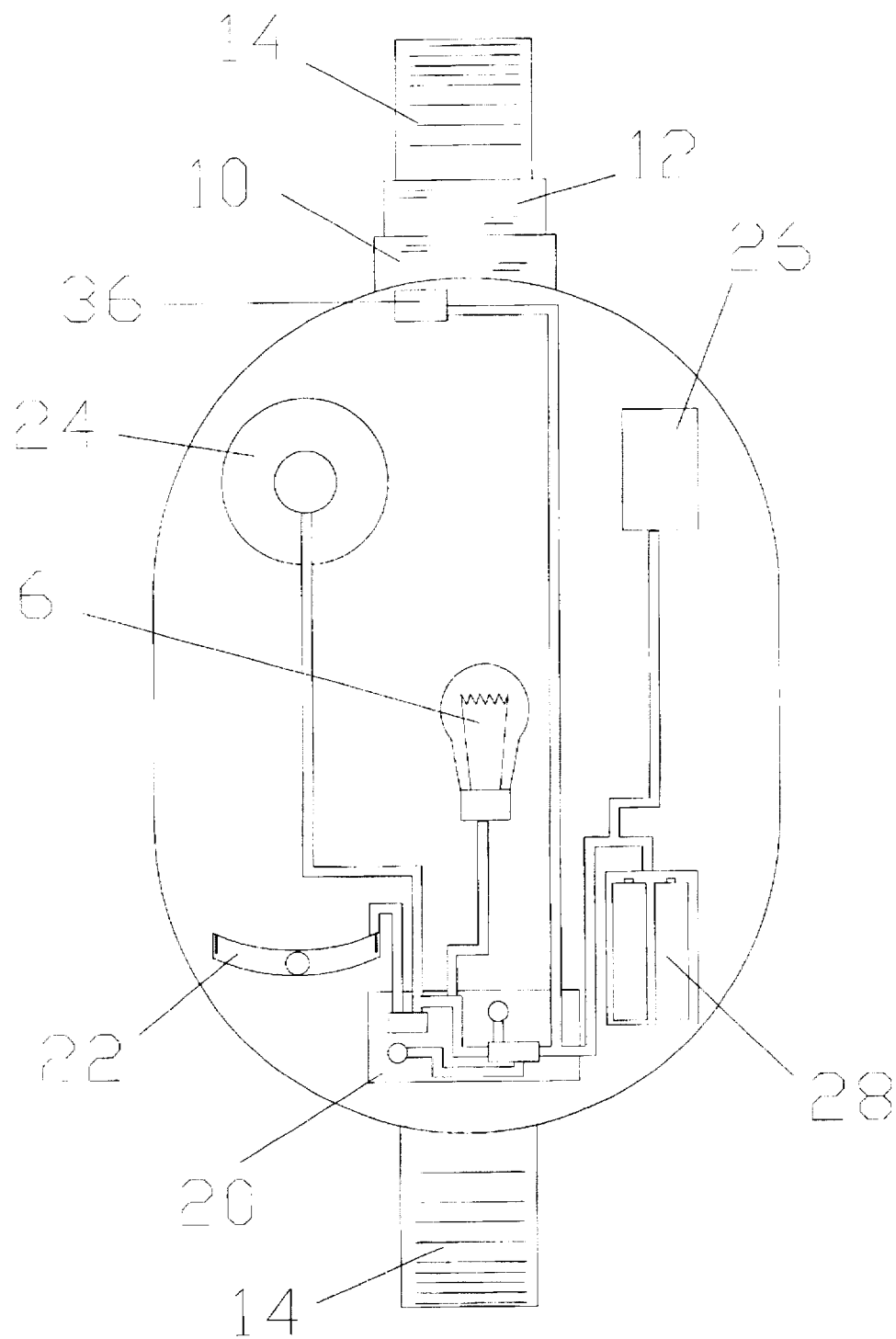
FIG. 3 is a front view of the invention without cover and lens.

FIG. 3 shows a circuit board 20 located within the interior portion of housing 8 in the preferred embodiment of drinker's awareness device invention 2. Connected to circuit board 20 are a movement detector 22, a power source 28, a speaker 24, light source 6, a power switch 26 and a key activated switch 36. It is contemplated that the audio portion of drinker's awareness device invention 2 be an alarm, a signal, a worded message, or any combination thereof. It is contemplated in the preferred embodiment for power source 28 to be battery powered. FIG. 4 shows the rear portion of speaker 24, a power source cover 32, and power switch cover 30. Screws 34 attach power source cover 32 and power switch cover 30 to housing 8. In the preferred embodiment, screws 34 are flat head screws to make it difficult for an impaired person to access power source 28 and power switch 26.

To use the preferred embodiment of drinker's awareness device invention 2 on an automobile (not shown), one must first install power source 28 by removing screw 34 from power source cover 32, placing power source 28 into its operable position within housing 8, and then reattaching power source cover 32 with screw 34. Then one may similarly remove power switch cover 30 from housing 8, place power switch 26 into an engaged position, and reattach power switch cover 30 with screw 34. Housing 8 is then placed on the side of the automobile steering wheel (not shown) near to an operator, while steering wheel strap 14 is positioned on the side of the automobile steering wheel (not shown) remote from an operator. Buckle 12 on the free end of steering wheel strap 14 is then connected to buckle locking device 10 attached to housing 8. A key (not shown) is used to place key activated switch 36 into an engaged position. Thereafter, when someone moves in front of movement detector 22, as a person would do when attempting to start the automobile (not shown), circuit board 20 would activate both light 6 and speaker 24 which would either sound a siren, an alarm, a recorded voice message warning the intended operator against driving while impaired, or any combination thereof. A key (not shown), inserted into and rotated within keyhole 18 on buckle locking device 10, would be required to deactivate light 6 and speaker 24. In the alternative, to turn off drinker's awareness device invention 2, screws 34 could be removed from power source cover 32 or power switch cover 30, so that power source 28 could be removed from its operable position within housing 8 or so that power switch 26 could be disengaged.

What is claimed is:

1. A warning device for a potentially impaired operator of a motorized vehicle to warn against operating said motorized vehicle while impaired, said warning device comprising:

a housing having an outer surface and a hollow interior, a circuit board located within said hollow interior;

a visual member attached through said outer surface and connected to said circuit board to attract the attention of said potentially impaired operator;

a speaker connected to said circuit board to provide audio messages to said potentially impaired operator;

a movement detector located within said hollow interior and connected to said circuit board to sense the presence of said potentially impaired operator;

attachment means to attach said housing to said motorized vehicle;

a locking means connected between said attachment means and said housing;

a power source located within said hollow interior and connected to said circuit board; and a key activated power switch for activating and deactivating said warning device by placing a key into a keyhole, and rotating said key therein.

2. The warning device of claim 1 further comprising a lens and wherein said visual member comprises a light source, said lens being positioned adjacent to said light source.

3. The warning device of claim 1 wherein said visual member comprises an intermittently activated light source.

4. The warning device of claim 1 wherein said power source is a battery.

5. The warning device of claim 1 wherein said attachment means comprises a steering wheel strap.

6. The warning device of claim 5 further comprising strap adjusting means connected to said steering wheel strap.

7. The warning device of claim 5 wherein said locking means comprises a buckle attached to said steering wheel strap and a buckle locking device permanently attached to said housing, said buckle locking device capable of receiving and securely attaching to said buckle.

8. A warning device for a potentially impaired operator of a motorized vehicle to warn against operating said motorized vehicle while impaired, said warning device comprising:

a housing having an outer surface and a hollow interior;

a circuit board located within said hollow interior;

a light source attached through said outer surface and connected to said circuit board to attract the attention of said potentially impaired operator;

a speaker connected to said circuit board to provide audio messages to said potentially impaired operator;

a movement detector located within said hollow interior and connected to said circuit board to sense the presence of said potentially impaired operator;

a steering wheel strap having opposite ends, one of said ends permanently connected to said housing;

a buckle attached to the other of said ends of said steering wheel strap;

a buckle locking device permanently attached to said housing for receiving and connecting with said buckle, said buckle locking device having a keyhole located thereon;

a key for locking and unlocking said buckle locking device;

a power source located within said hollow interior and connected to said circuit board; and a key activated power switch for engaging and disengaging power to said circuit board so that when said key is placed into and rotated within said keyhole, said key activated power switch interrupts power to said circuit board and said light source and said speaker become inactivated.

9. The warning device of claim 8 wherein said light source is an intermittently activated light source.

10. The warning device of claim 8 further comprising strap adjusting means connected to said steering wheel strap.

11. A method for warning a potentially impaired operator of a motorized vehicle against operating said motorized vehicle while impaired, said method comprising the steps of:

providing a warning device comprising a housing having an outer surface and a hollow interior, a circuit board located within said hollow interior, a light source attached through said outer surface and connected to said circuit board to attract the attention of said potentially impaired operator, a speaker connected to said circuit board to provide audio messages to said potentially impaired operator, a movement detector located within said hollow interior and connected to said circuit board, a steering wheel strap having opposite ends, one of said opposite ends permanently connected to said housing, a buckle attached to the other of said opposite ends of said steering wheel strap, a buckle locking device permanently attached to said housing for receiving and connecting with said buckle, said buckle locking device having a keyhole located thereon, a key for locking and unlocking said buckle locking device, a power source located within said hollow interior and connected to said circuit board, a power source cover retaining said power source within operable positions within said housing, a power switch for activating and deactivating said warning device, a power switch cover for concealing said power switch within said housing, and a key activated switch for engaging and disengaging power to said circuit board;

removing said power switch cover from said housing;

placing said power switch to an engaged position;

reattaching said power switch cover to said housing;

placing said housing on the opposed side of a steering wheel near to said operator, while positioning said steering wheel strap on the other of said opposed sides of said steering wheel remote from said operator;

connecting said buckle to said buckle locking device;

using said key to place said key activated switch into an engaged position;

inserting said key into said keyhole; and rotating said key within said keyhole on said buckle locking device to deactivate said light source and said speaker.

* * * * *